United States Patent [19]

Kirsch

[11] 4,165,921

[45] Aug. 28, 1979

[54] HORIZONTALLY AND VERTICALLY ADJUSTABLE MIRROR MOUNTING

[76] Inventor: Jerry Kirsch, 36 Beacon Hill, Grosse Pointe Farms, Mich. 48236

[21] Appl. No.: 923,578

[22] Filed: Jul. 11, 1978

Related U.S. Application Data

[62] Division of Ser. No. 777,901, Mar. 16, 1977, Pat. No. 4,107,539.

[51] Int. Cl.² .............................................. G02B 7/18
[52] U.S. Cl. ..................................... 350/288; 248/487
[58] Field of Search ............... 350/288, 307; 248/487, 248/479, 484, 481

[56] References Cited

U.S. PATENT DOCUMENTS

| | | | |
|---|---|---|---|
| 1,380,193 | 5/1921 | Diuguid | 248/487 |
| 1,380,910 | 6/1921 | Hubbard | 248/487 |
| 2,486,105 | 10/1949 | Bonar | 248/479 |
| 3,698,798 | 10/1972 | Bolton | 248/487 |

*Primary Examiner*—Jon W. Henry
*Attorney, Agent, or Firm*—Willis Bugbee

[57] ABSTRACT

Vertically bored for horizontally swingable mounting on a vertical pivot pin fixed in a base is an upstanding mirror holder support post containing a horizontal partly-cylindrical recess thereacross, the horizontal axis of which intersects the vertical axis of the pivot pin. Mating with the partly-cylindrical recess and coaxial therewith is a horizontal partly-cylindrical convex mirror holder with a flat front mirror mounting face thereon. A first set screw locks the post in its horizontally-adjustable position relatively to the pivot pin, whereas a second set screw locks the mirror holder in its vertically-adjusted position relatively to the mirror holder support post.

5 Claims, 6 Drawing Figures

HORIZONTALLY AND VERTICALLY ADJUSTABLE MIRROR MOUNTING

This is a division of my copending application Ser. No. 777,901 filed Mar. 16, 1977 for Laser Workpiece Position and Presence Inspector and Machine Control Governor, issued as U.S. Pat. No. 4,107,539 on Aug. 15, 1978.

BACKGROUND OF THE INVENTION

Hitherto, serious accidents have occurred in workpiece shape-altering machines, such as stamping presses, when the workpiece has been improperly positioned in the die-set thereof or when the stamped workpiece sticks in the upper die or punch and is carried upward while the new workpiece has been automatically fed into the die-set by the conveyor machine. The result has been that when the punch or upper die has again descended, the workpiece adhering to it has clashed with the next workpiece, which has meanwhile been fed to the die set, with dangerous consequences to the operator as well as to the machine. Previously, workpiece-positioning systems have been provided with limit switches in conjunction with an electrical circuit for attemptedly indicating when a workpiece blank has been improperly positioned in the press die-set, but such limit switches have often failed as a result of their repeated operations, with the result that the intendedly safeguarding system no longer operates successfully. In one instance, for example, the inspection system did not indicate the improperly positioned workpiece, with the result that the workpiece was hurled across the room by the improper contact of the punch therewith, causing serious danger to bystanders.

SUMMARY OF THE INVENTION

The invention principally resides in the provision of the laser beam source transmitting its outgoing beam into the beam splitter for subsequent division into two beams, one of which notifies the control system of the workpiece shape-altering machine whether or not the workpiece has been properly positioned in the die set and subsequently is properly removed therefrom. A further feature of the invention resides in the provision of means for transmitting to the machine control system the requisite information either for proper operation or for halting the machine or preventing its operation when proper information as to the position and presence of the workpiece has not been transmitted to the machine control system. If the workpiece unintendedly adheres to the upper die of the die set and ascends with it, the laser beam reaches the laser beam detector prematurely, i.e., before the predetermined time of operation of the workpiece removal and resupply mechanism, whereupon this indication of improper and untimely removal of the workpiece operates the safety control circuitry of the workpiece shape-altering operation until the improperly-lifted workpiece is removed from the upper die.

IN THE DRAWINGS

FIG. 1 is a diagrammatic perspective view of a laser workpiece position and presence inspector and machine control governor, according to one form of the invention, showing a workpiece blank properly in position for proper utilization of the two laser beam portions from the beam splitter permitting work operation of the workpiece shape-altering machine, such as a trimming and piercing die-set in a stamping press (not shown), upon a partially-completed workpiece;

FIG. 3 is a side elevation, with the cover in central vertical section, of an adjustable reflector employed in the arrangement of FIG. 1;

FIG. 4 is a top plan view of the reflector, with the top of the cover removed as shown by the section lines 4—4 in FIG. 3;

Figure 1:
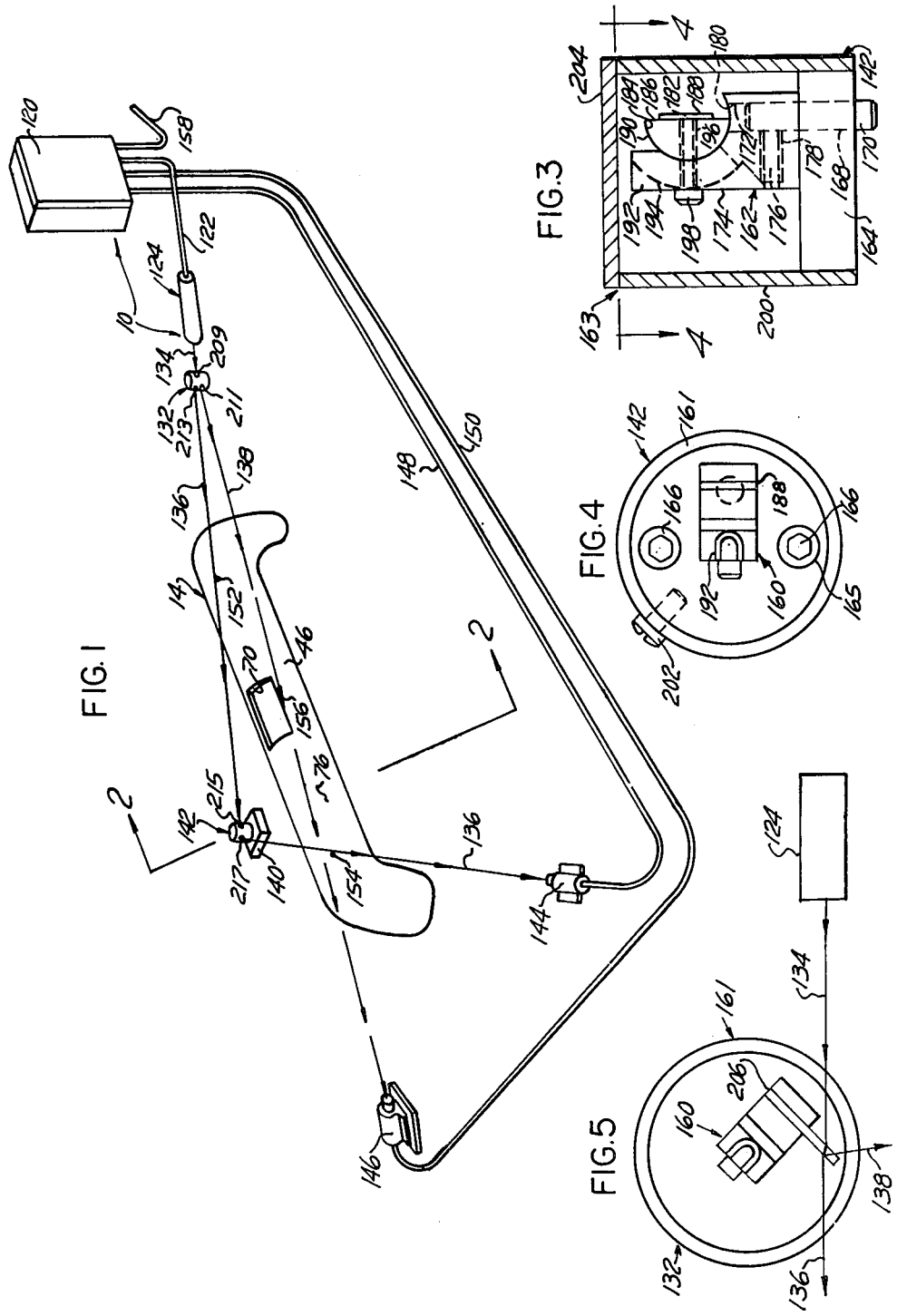
Figure 6:
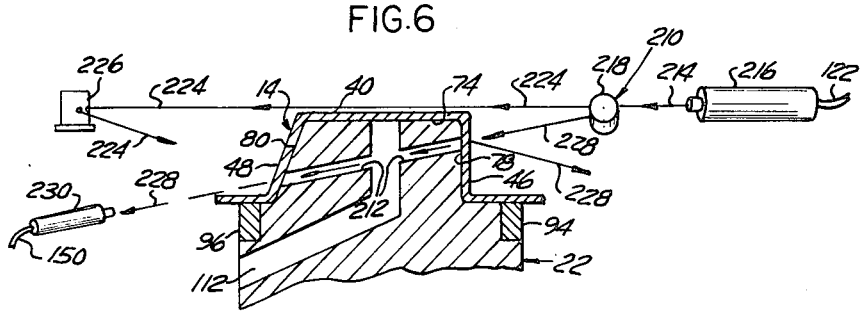

FIG. 5 is a section similar to FIG. 4 but showing in top plan view a beam splitter and its mount employed in the arrangement shown in FIG. 1, with the top of the cover removed; and FIG. 6 is a diagrammatic central vertical section through a stamping press equipped with a trimming and piercing die-set having a laser workpiece position and presence inspector and maching control governor wherein the lower die is provided with a laser beam tunnel therethrough.

Figure 2:
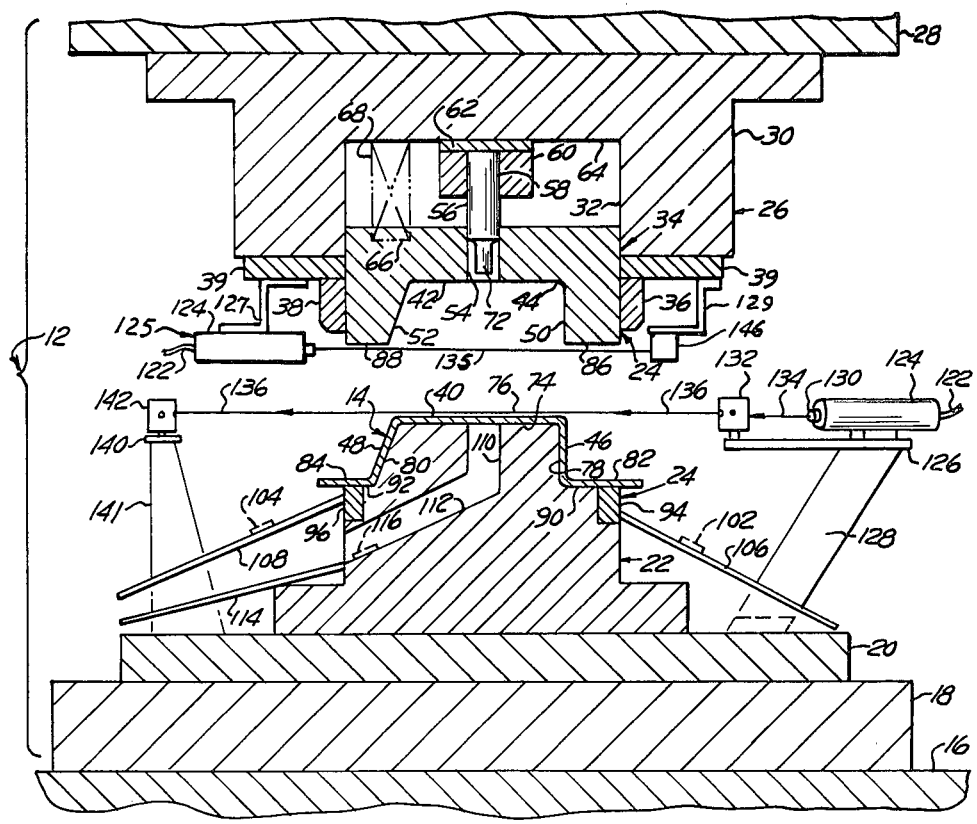
FIG. 2 is a central vertical section through a conventional trimming and piercing die-set and adjacent portions of a conventional stamping press, equipped with the laser workpiece-position inspector and machine control governor of the present invention, looking in the direction of the arrows 2—2 in FIG. 1.

Referring to the drawings in detail, FIGS. 1 and 2 show a laser workpiece position and presence inspector and machine control governor, generally designated 10, installed in a workpiece shape-altering machine such as a stamping press, generally designated 12, for determining the proper position or for detecting a departure therefrom of a workpiece 14 which is to be further formed by the workpiece shape-altering machine 12. For convenience of illustration, the workpiece 14 is shown as an automobile bumper requiring trimming and piercing before it is finished. In particular, FIG. 2 shows the workpiece 14, after it has been previously subjected to forming and flanging operations but before the peripheries of the flanges have been cut off by the machine 12 and before the central portion has been pierced.

The workpiece shape-altering machine 12 of FIG. 2 is shown as a conventional stamping press having a press bed 16 upon which is mounted a bolster 18 surmounted by a lower die shoe 20 which in turn supports the post 22 of a trimming and piercing die-set, generally designated 24, having an upper die 26 secured to a movable platen 28. The latter is moved upward and downward in a conventional manner, such as by a crank mechanism or by hydraulic cylinder and piston motors (not shown). Such stamping presses 12 are conventional, are controlled by conventional electric control circuits, and their details form no part of the present invention.

The upper die 26 consists of an upper die show 30 which is flanged at its upper end for securing it to the platen 28. The upper die shoe 30 is provided with a recess or cavity 32 in which an upper pad 34 is mounted for vertical reciprocation relatively to the upper die shoe 30 in which it is mounted. Laterally-spaced elongated trimming cutters 36 and 38 are secured to and depend from a plate 39 which in turn is secured to the upper die shoe 30 and also guide the upper pad 34 which performs the function of holding down the workpiece 14 during the trimming operation. In particular, the central substantially flat portion 40 of the workpiece 14 is held down by the substantially flat bottom 42 of the cavity 44 in the upper pad 34, whereas the opposite sides 46, 48 of the workpiece 14 are retained in position respectively by the perpendicular side surface 50 and inclined side surface 52 of the cavity 44. The upper pad 34 has a central bore 54 through which projects a piercing punch 56 seated in a bore 58 of a mount 60 secured to a plate 62 which in turn is secured to the bottom 64 of the cavity 32. The upper pad 34 is recessed at 66 to receive the lower ends of a plurality of helical compression springs 68, only one of these springs being shown in FIG. 2 as lying in the plane of the drawing. The compression coil springs 68 constantly urge the upper pad 34 downward relatively to the piercing punch 56 but yield to permit the piercing punch to form a hole 70 in the workpiece 14 (FIG. 1). For this purpose the punch 56 is provided with a reduced diameter nose 72.

The post 22 has a substantially flat upper surface 74 which supports the central portion 76 of the workpiece 14 in cooperation with the bottom surface 42 of the upper pad 34, and has respectively perpendicular and inclined opposite side surfaces 78 and 80 cooperating with the opposite side surfaces 50 and 52 respectively of the upper pad 34 to hold down the opposite side portions 46 and 48 of the workpiece 14. The horizontal flanges 82 and 84 are held down by the cooperation of the horizontal lower peripheral surfaces 86 and 88 of the upper pad 34 with the correspondingly formed horizontal portions 90 and 92 respectively of the lower die 22. Stationary cutoff members 94 and 96 are recessed into the post 22 immediately below the horizontal surfaces 90 and 92 and cooperate with the vertically-movable trimming cutters 36 and 38 to cut off the outer portions of the workpiece flanges 82 and 84.

The scrap edge portions 102 and 104 shown by the dotted lines in the lower portion of FIG. 2 constitute the severed portions of the workpiece 14 cut off by the movable trimming cutters 36 and 38 cooperating with the stationary cutoff members 94 and 96 respectively. The severed portions 102 and 104 slide down inclined plates 106 and 108 to points of disposal. The post 22 of the die set 24 is formed with a post bore 110 aligned with the punch 56 and with the central bore 54 to the upper pad 34 to receive the severed scrap portion shown by the dotted lines 116 resulting from the punch 56 producing the hole 70 in the workpiece 14 (FIG. 1). This severed scrap portion 116 slides down an inclined chute 112 onto an inclined plate 114 and thence to a point of disposal.

The laser workpiece position inspector 10 (FIG. 1) is provided with a laser energization and control unit 120 from which a conductor cable 122 proceeds downward to a conventional laser beam generator or coherent light source 124 mounted on a platform 126 which in turn is mounted on an inclined post or stanchion 128, the lower end of which rests upon and is secured to the lower die shoe 20 (FIG. 2). Also mounted on the platform 126 in optical alignment with the outgoing laser beam 134 from the laser beam outlet 130 is a laser beam splitter 132 which divides the outgoing laser beam 134 into a workpiece position-indicating laser beam 136 and a workpiece presence-indicating laser beam 138 (FIG. 1). Mounted on a platform 140 on an upright post or stanchion 141 is a laser beam reflector 142. The details of the laser beam splitter 132 and the laser beam reflector 142 are set forth in more detail below.

Aligned with the reflected component of the workpiece position-indicating laser beam 136 is a workpiece position detector 144 (FIG. 1) whereas aligned with the workpiece presence-indicating laser beam 138 is a workpiece presence detector 146. From the detectors 144 and 146, the conductor cables 148 and 150 run back to the laser energization and control unit 120, which is electrically connected in governing relationship to the press control circuit by the cable 158. The laser beam generator 124, beam splitter 132, reflector 142 and position detector 144 are so mounted and oriented that the incident and reflected components of the workpiece position-indicating beam 136 cross and recross the opposite end portions 152 and 154 respectively of the workpiece 14 in grazing relationship when the workpiece 14 is properly positioned upon the lower die 22, i.e., without being tilted or otherwise misaligned, as explained below in connection with the operation of the invention.

When the workpiece 14 is thus properly positioned, both the incident and reflected components of the workpiece position-indicating laser beam 136 pass unobstructedly to the workpiece position detector 144, hence are shown in solid lines in FIG. 1. If, on the other hand, the workpiece 14 is present in the die-set 24 upon the post 22, it obstructs the workpiece presence-indicating laser beam 138 so that the incident component thereof encounters, as an obstruction, the side 46 of the workpiece 14 and does not pass beyond it. Accordingly, the incident component of the workpiece presence-indicating laser beam 138 is shown in solid lines up to the point 156 of laser beam obstruction and in dashed lines therebeyond. The dashed lines indicate the direction which the workpiece presence-indicating laser beam 138 would have taken toward the workpiece presence detector 146 if the workpiece 14 had not been present in the die set 24, and the actual portion of the workpiece presence-indicating laser beam 138 itself is proceeding unobstructedly to the workpiece presence detector 146 in the event that the workpiece 14 is absent from its proper position on top of the post 22 of the die set 24 or has not been delivered thereto by the workpiece conveying mechanism.

The laser beam source or generator 124, the workpiece position detector 144 and the workpiece presence detector 146 are conventional and their details are beyond the scope of the present invention. The laser beams 134, 136 and 138 constitute narrow weightless and absolutely rectilinear rods or pointers which, being of coherent light, are substantially without diffusion throughout their paths of travel. As their widths are of only a few thousandths of an inch, they maintain their substantially original intensity over their entire path of ttravel. Thus, an ordinarily insignificant displacement of the workpiece 14 shows up instantly when that displacement intercepts the laser beam 136 or 138 more accurately and more dependably than would be indicated by limit switches.

The beam splitter 132 (FIG. 5) and the reflector 142 (FIGS. 3 and 4) are provided with similar mounts generally designated 160 and 162 respectively, and differ only in the positioning of their respective mirrors, hence a single description will suffice for both. Both also are provided with similar inverted cup-shaped metal or plastic protective covers 161 and 163 respectively, therefore also requiring only a single description. The covers 161 and 163 provide protection against mechanical damage and oil or other vapors hear such machines 12. The mounts 160 and 162 (FIGS. 3, 4 and 5) are provided with cylindrical bases 164 which are bored and counterbored at circumferentially-spaced locations 165 to receive bolts or socket head screws 166 by which they are secured to their respective supports 126 or 140. The base 164 is provided with a vertical bore 168 which receives a vertical shaft or pin 170 firmly and immovably secured in its bore 168. The upper end of the shaft or pin 170 passes into a bore 172 in an upstanding post 174. The post 174 is adapted to be adjustably rotated by its bore 172 relatively to the shaft or pin 170 and fixed in its adjusted position by a headless set screw 176 threaded into a transverse or horizontal bore 178 communicating with the vertical bore 172.

The upper portion of the post 174 is provided with a cylindrical cutaway portion 180 disposed with its axis horizontal and therefore perpendicular to the axis of the vertical bore 172. Mounted in the cylindrical cutaway portion 180 for swinging motion around the axis 182 thereof is a semi-cylindrical mirror support 184 having a flat front mirror-mounting surface 186 coincident with the axis 182. Secured to the flat surface 186 as by a suitable adhesive (not shown) is a rear-surface mirror 188. The mirror support 184 is provided with a cylindrical rear surface 190 on the same curvature as the cylindrical cutaway portion 180 and arcuately slidable relatively thereto. The upper portion of the post 174 is provided with an arcuate slot or groove 192, the bottom 194 of which is concentric with the axis 162 and the cylindrical surfaces 180 and 190. The mirror support 184 is provided with a drilled and threaded bore 196 which receives the correspondingly-threaded shank of a set screw 198. The head of the set screw 198 is of less diameter than the width of the slot or groove 192 so that when the screw 198 is tightened, it engages the cylindrical bottom surface 194 of the groove 192. In this manner, the mirror support 194 may be rocked vertically around its horizontal axis 182 and the post 174 can be swung horizontally around the shaft or pin 170, the vertical axis of which, if extended, passes through the horizontal axis 182 of the cylindrical surfaces 180 and 190. Each cover 163, as previously stated, is of inverted cup-shaped form with a hollow cylindrical side wall 200 mating with the cylindrical base 164, the former of which is drilled and the latter drilled and threaded to receive a locking screw 202. A disc-shaped top 204 closes the upper end of the hollow cylindrical side wall 200.

The beam splitter 132 (FIG. 5), as previously stated, has a mount 160 of similar construction to the mount 162 of the reflector 142. The beam splitter 132, however, is provided with a beam splitting rear-silvered mirror 206 which is semi-transparent so that the outgoing laser beam 134 has a portion 136 which proceeds through it and a portion 138 of preferably equal intensity which is reflected by it. In order that the laser beams 134, 136 and 138 shall avoid being obstructed by the mount 160, the beam splitter mirror 206 is secured in a laterally-offset position relatively to the mirror support 184. The construction is otherwise the same as that described above for the reflector 142.

During the installation of the laser workpiece position and presence inspector and machine control governor 10, let it be assumed that the laser light source 124, beam splitter 132, reflector 142, workpiece position detector 144 and workpiece presence detector 146 have been mounted without their respective covers 163 and adjuated with respect to the lower die 22 of the workpiece shape-altering machine 12, so that a workpiece 14 properly positioned upon the latter will be properly oriented for the required passage or interception of the laser beams 134, 136 and 138, as explained above. Before the inspection arrangement 10 can be operated, however, the protective covers 161 and 163 must be drilled to provide a laser beam inlet aperture 209 and laser beam outlet apertures 211 and 213 for the beam splitter 132, and laser beam inlet and outlet apertures 215 and 217 respectively for the reflector 142.

If the cover 161 is of transparent plastic material, these apertures are properly positioned therein by causing the laser light source 124 to project its outgoing beam 134 onto the side wall of the plastic cover of the beam splitter 132, whereupon the locations of the resulting spots of light are marked and subsequently drilled to provide the apertures 209, 211 and 213. After these apertures are drilled, the transparent plastic cover 163 of the reflector 142 is similarly positioned and the locations of the spots of light on the cover created by the emergent beam 136 from the beam splitter 132 are marked and subsequently drilled to provide the apertures 215 and 217. The interior surface of the transparent plastic covers 161 and 163 are then coated with an opaque black material, such as by spraying, to prevent undesired entry, reflection or diffusion of outside light or of the laser beam.

If, on the other hand, the covers 161 and 163 are to be of metal, such as is desirable where there is danger from flying objects or other materials which might damage or destroy plastic covers, there is provided a correspondingly-shaped transparent cup-shaped plastic template of inside diameter adapted to snugly receive and slide in telescoping relationship over the steel or other metal cover to be drilled. This template is placed in the position ultimately to be occupied by the steel cover 161 or 163. The same procedure is then followed to cause the laser beam 134, 136 or 138, as the case may be, to project spots of light onto the plastic covers 163. The locations of these spots are then marked on the plastic templates, which are subsequently drilled in these locations. The cup-shaped transparent plastic templates are then telescoped over the steel covers 161 or 163 and their apertures used as drilling guides to drill the necessary apertures 219, 211 and 213 in the beam splitter 132, and the apertures 215 and 217 in the reflector cover 163. The steel or other metal covers 161 and 163 with their respective apertures thus provided, are then mounted on their respective bases 164, and adjusted by rotating them horizontally until their respective apertures are aligned with the laser beams 134, 136 and 138, whereupon the inspector 10 is ready for use.

In the operation of the workpiece position and presence inspector and machine control governor 10, with the various components thereof adjusted in the manner described above, let it be assumed that a workpiece 14, such as a stamped but untrimmed automobile bumper, has been placed in position upon the post 22 of the workpiece shape-altering machine 12, either manually or by a conveyor and workpiece handling system frequently used in such installations. Let it also be assumed that the workpiece 14 is properly positioned upon the post 22 and that the laser light source 124 is energized to produce the outgoing laser beam 134 which in turn is divided by the beam splitter 132 into emergent beams 136 and 138. When the workpiece 14 is thus properly positioned, the workpiece position indicating beam 136 proceeds uninterruptedly at grazing incidence over both the locations 152 and 154 near the opposite ends of the workpiece 14. As a result, the workpiece position detector 144 operates to indicate that the workpiece 14 has been properly positioned and transmits this information through the cable 146 to the control unit 120, which in turn transmits it through the cable 158 to the control circuit of the workpiece-shape-altering machine 12. At the same time, the workpiece presence indicating laser beam 138 proceeds to the point 156 on the workpiece 14 where it is obstructed by the latter and fails to reach the workpiece presence indicating detector 146. As a result the information that the workpiece 14 is present on the post 22 is transmitted through the cable 150 back to the control unit 120 which in turn transmits it through the cable 158 to the control circuit of the workpiece shape-altering machine 12 that the workpiece 14 is both present and in its proper position, releases the otherwise conventional machine control circuit to cause the platen 28 and upper die 34 to descend and carry out the forming operations upon the workpiece 14.

If, on the other hand, the workpiece 14 is improperly positioned, such as, for example, being tilted so that the point 152 is higher than the point 154, the portion of the workpiece 14 adjacent the point 152 interrupts the workpiece position indicating laser beam 136 so that it does not reach the reflector 142, whereupon the workpiece positioning detector 144 does not receive the beam 136 and transmits this information to the control unit 120 by way of the cable 148. If, on the other hand, the workpiece 14 is tilted in the opposite direction so that the incident workpiece position indicating laser beam 136 is transmitted unobstructed to the reflector 142 but its reflected component 136 is obstructed by the workpiece 14 at the point 154, the same result occurs in that the workpiece position indicating detector 144 does not receive the laser beam 136 and transmits this information along the cable 148 to the control unit 120. In either event, the equipment in the control unit 120 through the cable 158 to the control circuit of the workpiece shape-altering machine 12 prevents the operation of the workpiece shape-altering machine 12, such as a stamping press (FIG. 2), and consequently the platen 28 and the upper die 26 are prevented from moving downward until the improper position of the workpiece 14 is corrected.

If, now, there happens to be no workpiece 14 at all on the post 22, such as if none has been delivered thereto by the workpiece conveying and supplying mechanism, the workpiece presence indicating laser beam 138 is no longer obstructed by any workpiece 12 at the point 156 but passes directly onward into the workpiece presence detector 146, which thereupon transmits this workpiece absence information through the cable 150 to the control unit 120, and thence through the cable 158 to the otherwise conventional press control circuit to again prevent operation of the workpiece-shape-altering machine 12 until the foregoing condition is corrected by properly positioning a workpiece blank 14 upon the post 22.

If, on the other hand, a previously-formed workpiece has adhered to the upper punch 56 and has been carried upward with it prior to the time set by the control unit 120 for its ejection and resupply, the upper workpiece presence indicator generally designated 125 (FIG. 2) comes into operation. This is of similar construction and operation to the workpiece presence indicator 10 of FIGS. 1 and 2 except that the beam splitter 132 is omitted. The equipment and arrangement are otherwise similar, hence similar parts bear the same reference numerals.

The upper workpiece presence detector thus is provided with a laser beam generator or source 124 like the lower indicator but this is suspended by a bracket 127 from the plate 39 and its laser beam 136 passes at grazing indicence past the horizontal peripheral surfaces 86 and 88 of the upper pad 34 to a detector 146 also mounted on a bracket 129 likewise secured to and depending from the plate 39. As a consequence, if a previously-formed workpiece 14 adheres to and is carried upward by the upper punch 56, its lower flanges 82 and 84 or its side wall portions 46 or 48 interrupt the laser beam 135 so that it no longer reaches the detector 146, whereupon the press control system is caused to halt the press until the improperly adhering workpiece 14 has been removed from the upper punch 56 and/or cavity 44 of the upper pad 34.

The modified workpiece position and presence inspector and machine control governor, generally designated 210 (FIG. 6) is largely similar to the workpiece presence inspector portion 138, 146, 148 of the workpiece position and presence inspector 10 shown in FIGS. 1 and 2, except that its installation is somewhat different. Like parts are accordingly designated with the same reference numerals as in FIGS. 1 and 2, particularly as they refer to portions of the post 22 of the workpiece shape-altering machine 12 in connection with which the installation is made. Thus a laser beam generator or source 216 is connected by the cable 122 of FIG. 1 to the laser control unit 120. In particular, in FIG. 6, the post 22 is provided with a downwardly and obliquely inclined laser beam tunnel or passageway 212 through which, in the absence of a workpiece 14, the laser outgoing beam 214 proceeds from the laser beam generator or source 216 by way of the beam splitter 218 and diverted beam 228 to the workpiece presence detector 230, these being inclined correspondingly with the inclination of the laser beam tunnel 212. The direct beam 224 proceeds from the beam splitter 216 close to but above the point 152 (FIG. 1) on the far end of the workpiece 14 to the reflector 226 and thence close to but above the point 154 on the near end of the workpiece 14 to the workpiece position detector (not shown, but identical to the detector 144 in FIG. 1).

In the operation of the modified workpiece position and presence inspector 210 of FIG. 6, let it be assumed that a workpiece 14 is properly mounted upon the post 22 and that the laser beam generator 216 has been energized. The outgoing laser beam 214 from the laser beam generator 216 proceeds to the beam splitter 218, whence the diverted beam 228 travels only as far as the side portion 46 of the workpiece 14 where it is obstructed thereby and is either diffused or reflected as shown by the solid line portion of the diverted beam 228 when the workpiece 14 is present on the post 22, therefore, the diverted beam 228 cannot reach the workpiece presence detector 230, as indicated by the dashed line 228. This information is transmitted through the cable 150 (FIG. 1) from the workpiece presence detector 230 to the laser control unit 120. The latter thereupon transmits it through the cable 158 to the press control circuit which then permits the platen 28, punch 56 and pad 34 to descend and carry out their trimming operations upon the workpiece 14, as described above in connection with the operation of the workpiece position and presence inspector 10 of FIGS. 1 and 2.

In the event, however, that no workpiece 14 is resting upon the lower die 20, the portion of the diverted laser beam 228 indicated by the dashed lines passes unimpededly downward through the inclined tunnel 212 and reaches the workpiece presence detector 230, whereupon the laser control unit 120 (FIG. 1) is notified of that fact through the cable 150 and transmits this information through the cable 158 to the machine control circuit, whereupon the platen 28 of the press 12 is accordingly prevented from descending until a workpiece 14 has actually been delivered to and properly mounted upon the lower die 20. If, on the other hand, the workpiece 14 has been properly trimmed but has adhered to the punch 56 and/or to the cutters 36 and 38 and has been carried undesiredly upward prior to tee time set by the control unit 120 for its proper ejection and resupply of another workpiece 14, the premature unblocking of the laser beam 228 so informs the control unit 120, which thereupon halts the press 12 as described above until the improperly-adhering workpiece 14 has been removed.

The advantages of the single laser beam generator 124 or 216 in combination with the beam splitter 218 over the use of two separate laser beam generators lies in the fact that failure of the single laser beam generator 124 or 216 in the system of the present invention is a "fail-safe" device in that such failure shuts down and renders inoperative and press control circuit. In contrast to this, failure of one of the two separate laser beam generators would indicate to the press control circuit that a workpiece was present on the workpiece forming support or die, whereas no workpiece was actually present, and the press would be permitted to operate. This would be disastrous if, for example, an already formed workpiece had adhered to the upper die and a new workpiece was permitted to be fed to the lower die, so that upon operation of the press the upper workpiece would clash with the lower workpiece, seriously damaging the dies and possibly also injuring any bystander.

A similar advantage results from the use of crossing and recrossing laser beams at separate locations on the workpiece from a beam splitter and a single laser beam generator rather than from two separate laser beam generators without the beam splitter.

I claim:

1. A horizontally and vertically adjustable mirror mounting structure, comprising
    a base,
    a vertical pivot element mounted on said base,
    an upstanding mirror holder support mounted on said pivot element for horizontal rotational adjustment relatively to said base and having a horizontal partly cylindrical recess disposed horizontally thereacross,
    a mirror holder having on one side thereof a mirror mounting surface and having on the opposite side thereof a horizontal partly cylindrical convex surface disposed in mating engagement with said horizontal partly cylindrical recess for vertical rotational adjustment relatively to said base,
    one arm for locking said mirror holder support in its horizontally-rotated position of adjustment relatively to said base, and
    means for locking said mirror holder in its vertically-rotated position of adjustment relatively to said base.

2. A horizontally and vertically adjustable mirror mounting structure, according to claim 1, wherein said means for locking said mirror holder relatively to said mirror holder support includes a cylindrically arcuate slot in said mirror holder support on the opposite side thereof and coaxial with said partly cylindrical recess.

3. A horizontally and vertically adjustable mirror mounting structure, according to claim 2, wherein said locking means comprises a threaded hole in said partly cylindrical convex surface and a fastener having a threaded shank passing through said arcuate slot into threaded engagement with said threaded hole and having a head clampingly engaging the surfaces of said mirror holder support adjacent said slot.

4. A horizontally and vertically adjustable mirror mounting structure, according to claim 3, wherein said surface of said mirror holder support adjacent said slot is partly cylindrical and disposed coaxial with said partly cylindrical recess.

5. A horizontally and vertically adjustable mirror mounting structure, according to claim 2, wherein a hollow cover is disposed over said mirror holder support and mirror holder and has apertures therein opposite said mirror holder for the passage of optical beams and wherein fastening means is disposed between said cover and said base for securing said cover to said base.

* * * * *